US010479908B2

(12) United States Patent
Tamura et al.

(10) Patent No.: US 10,479,908 B2
(45) Date of Patent: Nov. 19, 2019

(54) METHOD OF MANUFACTURING HARD COAT FILM

(71) Applicant: FUJIFILM Corporation, Tokyo (JP)

(72) Inventors: Akio Tamura, Kanagawa (JP);
Katsuyuki Takada, Kanagawa (JP);
Takayasu Yamazaki, Kanagawa (JP);
Keisuke Oku, Kanagawa (JP); Keigo Ueki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 119 days.

(21) Appl. No.: 15/782,248

(22) Filed: Oct. 12, 2017

(65) Prior Publication Data

US 2018/0044547 A1 Feb. 15, 2018

Related U.S. Application Data

(63) Continuation of application No. 14/672,935, filed on Mar. 30, 2015, now abandoned.

(30) Foreign Application Priority Data

| Mar. 31, 2014 | (JP) | 2014-074680 |
| Sep. 29, 2014 | (JP) | 2014-199034 |
| Oct. 9, 2014 | (JP) | 2014-208186 |
| Mar. 6, 2015 | (JP) | 2015-044734 |

(51) Int. Cl.
| C09D 133/14 | (2006.01) |
| C09D 4/00 | (2006.01) |
| B05D 7/02 | (2006.01) |
| B05D 3/00 | (2006.01) |
| C08F 222/10 | (2006.01) |

(52) U.S. Cl.
CPC ........... *C09D 133/14* (2013.01); *B05D 3/007* (2013.01); *C08F 222/1006* (2013.01); *C09D 4/00* (2013.01); *B05D 7/02* (2013.01)

(58) Field of Classification Search
CPC ........ B05D 3/007; B05D 7/02; C09D 133/14; C09D 4/00; C08F 222/1006
USPC .......................................................... 526/59
See application file for complete search history.

(56) References Cited

U.S. PATENT DOCUMENTS

| 6,326,074 | B1 | 12/2001 | Takahashi |
| 6,777,102 | B2 | 8/2004 | Sakurai et al. |
| 2003/0004221 | A1 | 1/2003 | Sakurai et al. |
| 2004/0167280 | A1 | 8/2004 | Kayanoki |
| 2009/0311518 | A1 | 12/2009 | Valeri |
| 2011/0159278 | A1* | 6/2011 | Lee .................. C09D 4/00 428/336 |
| 2013/0235515 | A1* | 9/2013 | Ouderkirk ...... G02F 1/133308 361/679.01 |

FOREIGN PATENT DOCUMENTS

| JP | H05-320287 A | 12/1993 |
| JP | H07-196947 A | 8/1995 |
| JP | H08-73771 A | 3/1996 |
| JP | H08-269392 A | 10/1996 |
| JP | 2000-302840 A | 10/2000 |
| JP | 2003-147017 A | 5/2003 |
| JP | 2003-313328 A | 11/2003 |
| JP | 2003-327899 A | 11/2003 |
| JP | 2004-141732 A | 5/2004 |
| JP | 2007-237483 | * 9/2007 |
| JP | 2007-237483 A | 9/2007 |
| JP | 2010-008659 A | 1/2010 |
| JP | 2010-100736 A | 5/2010 |
| JP | 2010-122315 A | 6/2010 |
| JP | 2011-522941 A | 8/2011 |
| JP | 2012-167271 A | 9/2012 |
| JP | 2012-229412 A | 11/2012 |
| JP | 2015-199815 A | 11/2015 |
| JP | 2016-030341 A | 3/2016 |
| JP | 6224639 B2 | 11/2017 |
| WO | 02/102907 A1 | 12/2002 |

OTHER PUBLICATIONS

Final Office Action issued in U.S. Appl. No. 14/672,935 dated Oct. 31, 2017.
Notification of Reasons for Refusal issued by the Japanese Patent Office dated Nov. 14, 2017, in connection with Japanese Patent Application No. 2016-238175.
Second Office Action issued by The State Intellectual Property Office of People's Republic of China dated Jan. 9, 2019, in connection with Japanese Patent Application No. 201510148660.9.
Office Action issued by the State Intellectual Property Office of China dated Jan. 17, 2018, in connection with Chinese Patent Application No. 201510148660.9.
Notification of Reasons for Refusal issued by the Japanese Patent Office (JPO) dated Feb. 21, 2017, in connection with Japanese Patent Application No. 2015-044734.

(Continued)

*Primary Examiner* — William K Cheung
(74) *Attorney, Agent, or Firm* — Edwards Neils LLC; Jean C. Edwards, Esq.

(57) ABSTRACT

An aspect of the present invention relates to method of manufacturing a hard coat film, wherein the hard coat film comprises a plastic substrate and a hard coat layer, the method comprises forming the hard coat layer by subjecting a photopolymerizable hard coating composition to photopolymerization processing, and the photopolymerizable hard coating composition comprises a radical polymerizable compound having two or more radical polymerizable groups selected from the group consisting of acryloyloxy groups, acryloyl groups, methacryloyloxy groups, and methacryloyl groups per molecule, a cationic polymerizable compound, a radical photopolymerization initiator, and a cationic photopolymerization initiator.

15 Claims, No Drawings

(56) References Cited

OTHER PUBLICATIONS

Office Action, issued by the Japanese Patent Office (JPO) dated Aug. 9, 2016, in connection with corresponding Japanese Patent Application No. 2015-044734.

Non-Final Office Action issued in U.S. Appl. No. 14/672,935 dated May 11, 2017.

* cited by examiner

METHOD OF MANUFACTURING HARD COAT FILM

CROSS-REFERENCE TO RELATED APPLICATIONS

This patent application is a continuation patent application of U.S. patent application Ser. No. 14/672,935, filed Mar. 30, 2015, now abandoned, which claims priority under 35 U.S.C 119 to Japanese Patent Application No. 2014-74680 filed on Mar. 31, 2014, Japanese Patent Application No. 2014-199034 filed on Sep. 29, 2014, Japanese Patent Application No. 2014-208186 filed on Oct. 9, 2014, Japanese Patent Application No. 2015-44734 filed on Mar. 6, 2015. Each of the above applications is hereby expressly incorporated by reference, in its entirety.

BACKGROUND OF THE INVENTION

Field of the Invention

The present invention relates to a photopolymerizable hard coating composition, a hard coat film containing a hard coat layer formed of the photopolymerizable hard coating composition, a method of manufacturing hard coat film, and an article comprising the hard coat film.

Discussion of the Background

Plastics have the advantages of light weight, ease of processing, low cost, and good transparence. Thus, their utility as alternative materials for glass has drawn attention in applications where mainly glasses such as chemically reinforced glass have conventionally been employed. Examples of such applications are the protective surface films of touch panels and image display devices, and protective films for automobile window glass.

Plastics tend to be softer and undergo surface scratching more readily than glass. Accordingly, it has been proposed that hard coat films with good scratch resistance be provided by forming hard coat layers on plastic substrates (for example, see JP-A-2010-122315 and JP-A-2012-229412).

SUMMARY OF THE INVENTION

JP-A-2010-122315 and JP-A-2012-229412 disclose the forming on plastic substrates of hard coat layers (referred to as "(meth)acrylate hard coat layers" hereinafter) formed by applying a photopolymerization process to a photopolymerizable composition containing a prescribed (meth)acrylate. Here, the term "(meth)acrylate" as used in the present Description and in the present invention as set forth farther below includes the meaning of acrylate and methacrylate. The term "acrylate" refers to compounds containing one or more acrylic functional groups selected from the group consisting of acryloyloxy groups $H_2C=CH—C(=O)—O—$ and acryloyl groups $H_2C=CH—C(=O)—$ per molecule. The term "methacrylate" refers to compounds containing one or more methacrylic functional groups selected from the group consisting of methacryloyloxy groups $H_2C=C(CH_3)—C(=O)—O$ and methacryloyl groups $H_2C=C(CH_3)—C(=O)—$ per molecule. (Meth)acrylates also include compounds comprising one or more of each of the above acrylic functional groups and methacrylic functional groups.

When a hard coat layer curls (warps), it ends up causing the hard coat film containing the hard coat layer to curl. The generation of curling in a hard coat film renders handling difficult when winding hard coat films in the course of roll production and in the course of adhering hard coat films to other materials. There is a risk that it will cause increased loads in the manufacturing line of the hard coat film (for example, damage to pass rolls generated by curling). Thus, there is a need to inhibit the generation of curling in hard coat layers. The increased brittleness (tendency to develop cracks and split) of hard coat layers makes it difficult to maintain good scratch resistance in hard coat films by providing a hard coat layer.

Based on research conducted by the present inventors, although conventional (meth)acrylate hard coat layers afford the advantage of good scratch resistance, (meth)acrylate hard coat layers present problems in that (meth)acrylate hard coat layers tend to curl and need improvement in terms of brittleness.

It has conventionally been difficult to simultaneously achieve good scratch resistance, inhibit curling, and improve brittleness in (meth)acrylate hard coat layers.

An aspect of the present invention provides for a means of obtaining a hard coat film having a (meth)acrylate hard coat layer affording good resistance to scratching, exhibiting improvement in brittleness, and inhibiting curling.

The present inventors conducted extensive research into achieving the above means. As a result, they discovered that the above object could be achieved by means of the following photopolymerizable hard coating composition comprising:

a radical polymerizable compound having two or more radical polymerizable groups selected from the group consisting of acryloyloxy groups, acryloyl groups, methacryloyloxy groups, and methacryloyl groups per molecule;

a cationic polymerizable compound;

a radical photopolymerization initiator; and a cationic photopolymerization initiator.

That is, the fact that subjecting the photopolymerizable hard coating composition to photopolymerization processing made it possible to form a (meth)acrylate hard coat layer with good scratch resistance, in which curling was inhibited, and in which brittleness was improved was discovered by the present inventors through extensive research.

The conjecture by the present inventors that is given below in no way limits the present invention. The present inventors believe that the combined use of a radical polymerizable compound and a cationic polymerizable compound and the conducting of photopolymerization processing contribute to enhancing scratch resistance, inhibiting curling, and improving brittleness. More specifically, the present inventors presume that the combined use of radical polymerizable compounds ((meth)acrylates)), which are thought to greatly contribute to enhancing scratch resistance but are also thought to cause curing shrinkage to tend to occur, and cationic polymerizable compounds, which are thought to tend to prevent curing shrinkage, in a polymerizable compound contributes to enhancing scratch resistance and inhibiting curling. In addition, the present inventors believe that the fact that the polymer chain that is formed by polymerization of a radical polymerizable compound and the polymer chain that is formed by polymerization of a cationic polymerization compound become entangled, contributing to improvement in the area of brittleness.

In one form, the radical polymerizable compound is a urethane bond-containing compound containing one or more urethane bonds per molecule.

In one form, the urethane bond-containing compound contains two or more urethane bonds per molecule.

In one form, the cationic polymerizable compound contains a compound comprising a cyclic structure.

In one form, the cyclic structure-containing compound contains at least one cyclic structure selected from the group consisting of nitrogen-containing hetero rings, oxygen-containing hetero rings, and alicyclic structures.

In one form, the cyclic structure-containing compound contains a nitrogen-containing hetero ring-containing compound.

In one form, the nitrogen-containing hetero ring-containing compound contains one or more nitrogen-containing hetero ring selected from the group consisting of isocyanurate rings and glycoluril rings per molecule.

In one form, the nitrogen-containing hetero ring-containing compound contains an isocyanurate ring-containing compound.

In one form, the cationic polymerizable compound contains one or more cationic polymerizable groups selected from the group consisting of oxygen-containing hetero ring groups and vinyl ether groups.

In one form, the oxygen-containing hetero ring contained in the oxygen-containing hetero ring group is selected from the group consisting of: a single ring selected from the group consisting of epoxy rings, tetrahydrofuran rings, and oxetane rings; a fused ring containing one or more of these single rings; or an oxybicyclo ring.

In one form, the cationic polymerizable compound contains a cationic polymerizable compound having a cationic polymerizable group equivalence of less than 150 obtained by dividing the molecular weight by the number of cationic polymerizable groups contained per molecule.

In one form, the cationic polymerizable compound with a cationic polymerizable group equivalence of less than 150 is an epoxy ring-containing compound in which the epoxy equivalence obtained by dividing the molecular weight by the number of epoxy rings contained per molecule is less than 150.

When the cationic polymerizable compound is a polymer, the above molecular weight is the weight average molecular weight. Details regarding the weight average molecular weight will be given farther below. The same applies to the molecular weights that are recorded below.

In one form, the cationic polymerizable compound contains an oxetane ring-containing compound comprising one or more oxetane rings per molecule.

In one form, the cationic polymerizable compound contains one or more functional groups having an ethylenic unsaturated double bond per molecule.

In one form, the molecular weight of the cationic polymerizable compound is 500 or less.

In one form the molecular weight of the cationic polymerizable compound is 300 or less.

In one form, the photopolymerizable hard coating composition contains 0.05 to 50 weight parts of the cationic polymerizable compound per 100 weight parts of the combined contents of the cationic polymerizable compounds and the radical polymerizable compounds.

In one form, the radical polymerizable compound contains 2 or more urethane bonds per molecule.

In one form, the above composition further comprises one or more other radical polymerizable compounds. The other radical polymerizable compounds include the radical polymerizable compounds set forth below, not corresponding to radical polymerizable compounds containing two or more radical polymerizable compounds selected from the above group per molecule) along with the above-described radical polymerizable compound.

A further form of the present invention relates to a hard coat film comprising a plastic substrate and a hard coat layer formed by subjecting the above photopolymerizable hard coating composition to photopolymerization processing.

A further form of the present invention relates to a method of manufacturing a hard coat film comprising forming a hard coat layer by subjecting the photopolymerizable hard coating composition to photopolymerization processing; and containing a plastic substrate and a hard coat layer.

In one form, the plastic substrate contains at least one film selected from the group consisting of acrylic resin films and polycarbonate resin films.

In one form, the plastic substrate is a laminate film of two or more layers of resin film.

A further form of the present invention relates to an article containing a hard coat film.

In one form, the article comprises a protective surface film in the form of the above hard coat film.

One form of the present invention can provide a hard coat film having a (meth)acrylate hard coat layer affording good scratch resistance and inhibiting curling and cracking.

Other exemplary embodiments and advantages of the present invention may be ascertained by reviewing the present disclosure.

DETAILED DESCRIPTION OF THE EMBODIMENTS

The description set forth below is based on representative implementation forms of the present invention. The present invention is not limited to such implementation forms. Numeric ranges denoted using the word "to" in the present invention and present Description denote ranges including the preceding and succeeding numeric values as lower limits and upper limits, respectively.

[Photopolymerizable Hard Coating Composition]

The polymerizable hard coating composition relating to one form of the present invention comprises:

a radical polymerizable compound having two or more radical polymerizable groups selected from the group consisting of acryloyloxy groups, acryloyl groups, methacryloyloxy groups, and methacryloyl groups per molecule;

a cationic polymerizable compound;

a radical photopolymerization initiator; and a cationic photopolymerization initiator.

The term "photopolymerizable hard coating composition" is a composition capable of forming a hard coat layer when subjected to photopolymerization processing (irradiation with light). In the present invention, the term "hard coat layer" refers to a layer with a pencil hardness of 2H or greater as measured at the surface of the layer. The pencil hardness of 2H or greater that is specified here refers to meeting either evaluation standard A or B in the course of conducting the scratch resistance evaluation set forth in the embodiments below using a test pencil of hardness 2H as specified by JIS-S6006 after adjusting the humidity of the hard coat film containing the hard coat layer being measured to conditions of 60% relative humidity and 25° C. over two hours. When the same evaluation is conducted using a test pencil with a hardness of 3H as specified by JIS-S6006, evaluation standard A or B will be satisfied by a pencil of hardness 3H or greater. The same applies to pencil hardnesses of 4H and above, 5H and above, 6H and above, 7H and above, and the like. The radical polymerizable compound contained in the photopolymerizable hard coating composition relating to one form of the present invention is a (meth)acrylate and, as set forth above, a polymerizable compound capable of forming a hard coat layer affording excellent scratch resistance. However, as set forth above, conventional (meth)acrylate hard coat layers present problems in the form of curling and brittleness. By contrast, the photopolymerizable hard coating composition relating to one form of the present invention further contains a polymerizable compound in the form of a cationic polymerizable compound in addition to a radical polymerizable compound in the form of a (meth)acrylate. Causing these polymerizable compounds of different forms of polymerization to polymerize within the same composition inhibits curling and improves brittleness in the hard coat layer that is formed. This point was discovered by the present inventors.

The above photopolymerizable hard coating composition (also referred to hereinafter simply as the "composition") will be described in greater detail below.

<Polymerizable Compound>

The above composition contains polymerizable compounds in the form of radical polymerizable compound and cationic polymerizable compound, which are polymerizable compounds of different forms of polymerization.

The various polymerizable compounds will be sequentially described below.

(Radical Polymerizable Compound)

The above composition contains a radical polymerizable compound in the form of a multifunctional (meth)acrylate containing two or more radical polymerizable groups selected from the above per molecule. Just one multifunctional (meth)acrylate can be employed, or two or more multifunctional (meth)acrylates of differing structure can be used in combination as the multifunctional (meth)acrylate. One or more multifunctional (meth)acrylates and one or more other radical polymerizable compounds than multifunctional (meth)acrylate may be employed in combination. Other radical polymerizable compounds that can be employed in combination will be described farther below. The fact that for a given component, just one such component can be employed, or two or more such components of differing structure can be employed in combination, also holds true for the various components set forth farther below, such as the cationic polymerizable compound, radical photopolymerization initiator, and cationic photopolymerization initiator. The content of each component refers to the combined content when two or more such components are being used in combination.

At least one radical polymerizable compound (multifunctional (meth)acrylate) that is contained in the above composition is more specifically a compound containing two or more radical polymerizable groups selection from the group consisting of acryloyloxy groups, acryloyl groups, methacryloyloxy groups, and methacryloyl groups per molecule. The radical polymerizable groups (polymerizable groups capable of undergoing radical polymerization) that are selected from the above group are groups that are capable of undergoing photopolymerization (photopolymerizable groups). The use of a multifunctional (meth)acrylate containing two or more of these radical polymerizable groups per molecule as a radical polymerizable compound is useful to form a hard coat layer of great hardness. The two or more radical polymerizable groups that are contained in the above multifunctional (meth)acrylate can be identical or of two or more different types. The number of radical polymerizable groups selected from the above group that is contained in each molecule of the multifunctional (meth)acrylate is at least 2; is 2 to 10 for example; and is desirably 2 to 6. Among the radical polymerizable groups that are selected from the above group, acryloyloxy groups and methacryloyloxy groups are desirable.

A radical polymerizable compound with a molecular weight of not less than 200 but less than 1,000 is desirable as the above multifunctional (meth)acrylate. In the present invention, the term "molecular weight" refers to the weight average molecular weight as measured by gel permeation chromatography (GPC) and converted to a polystyrene equivalent for polymers. The following measurement conditions are an example of specific measurement conditions for weight average molecular weight.

GPC apparatus: HLC-8120 (made by Toso)
Column: TSK gel Multipore HXL-M (made by Toso, 7.8 mm inner diameter (ID), 30.0 cm [length])
Eluent: Tetrahydrofuran (THF)

In one form, the multifunctional (meth)acrylate can contain one or more urethane bonds per molecule along with the two or more radical polymerizable groups selected from the above group. A multifunctional (meth)acrylate containing one or more urethane bonds per molecule will be referred to as a "urethane (meth)acrylate" or "first radical polymerizable compound" below.

The number of urethane bonds contained per molecule in the first radical polymerizable compound is desirably 1 or more. From the perspective of achieving greater hardness in the hard coat layer that is formed, the number is 2, or 2 or more. For example 2 to 5 is preferred. In a first radical polymerizable compound containing two urethane bonds per molecule, the radical polymerizable groups selected from the above group can be directly bonded, or bonded through a connecting group, to just one of the urethane bonds, or the radical polymerizable groups can each be directly bonded, or bonded through connecting groups, to both of the urethane bonds. In one form, it is desirable for one or more of the radical polymerizable groups selected from the above group to be bonded to two urethane bonds that are bonded through connecting groups.

More specifically, in the first radical polymerizable compound, the urethane bonds and the radical polymerizable groups selected from the above group can be directly bonded, or a connecting group can be present between the urethane bonds and the radical polymerizable groups. The connecting groups are not specifically limited; examples are linear or branched saturated or unsaturated hydrocarbon groups, cyclic groups, and groups comprised of two or more of these. The number of carbon atoms in the hydrocarbon group is 2 to 20 by way of example, but there is no specific limitation. Examples of cyclic structures contained in cyclic groups are aliphatic rings (cyclohexanone rings and the like) and aromatic rings (benzene rings, naphthalene rings, and the like). The above groups can be substituted or unsubstituted. In the present invention and in the present Description, unless specifically stated otherwise, the groups that are listed can be substituted or unsubstituted. When a given group comprises a substituent, examples of the substituent are alkyl groups (such as alkyl groups having 1 to 6 carbon atoms), hydroxyl groups, alkoxy groups (such as alkoxy groups having 1 to 6 carbon atoms), halogen atoms (such as fluorine atoms, chlorine atoms, and bromine atoms), cyano groups, amino groups, nitro groups, acyl groups, and carboxyl groups.

The first radical polymerizable compound (urethane (meth)acrylate) set forth above can be synthesized by known methods. It is also available as commercial products.

One example of a method of synthesizing a urethane (meth)acrylate consists of reacting an isocyanate and a hydroxyl group-containing compound such as an alcohol, polyol, and/or hydroxyl group-containing (meth)acrylate or the liked. Alternatively, as needed, the urethane compound obtained by the above reaction can be esterified with (meth) acrylic acid. The term (meth)acrylic acid is used to mean both acrylic acid and methacrylic acid.

Commercial products of urethane (meth)acrylates are not limited to those listed below. Examples are: UA-306H, UA-306I, UA-306T, UA-510H, UF-800IG, UA-101I, UA-101T, AT-600, AH-600, and AI-600 made by Kyoeisha Chemical Co., Ltd.; U-4HA, U-6HA, U-6LPA, UA-32P, U-15HA, and UA-1100H made by Shin Nakamura Chemical Co., Ltd.; Ultraviolet UV-1400B, UV-1700B, UV-6300B, UV-7550B, UV-7600B, UV-7605B, UV-7610B, UV-7620EA, UV-7630B, UV-7640B, UV-6630B, UV-7000B, UV-7510B, UV-7461TE, UV-3000B, UV-3200B, UV-3210EA, UV-3310EA, UV-3310B, UV-3500BA, UV-3520TL, UV-3700B, UV-6100B, UV-6640B, UV-2000B, UV-2010B, and UV-2250EA made by Nippon Synthetic Chemical Industry Co., Ltd. Further examples are Ultraviolet UV-2750B made by Nippon Synthetic Chemical Industry Co., Ltd.; UL-503LN made by Kyoeisha Chemical Co., Ltd.; and Unidic 17-806, 17-813, V-4030, and V-4000BA made by Dainippon Ink and Chemicals Corporation; EB-1290K made by Daicel UCB Co., Ltd.; and Hi-Coap AU-2010 and AU-2020 made by Tokushiki Co., Ltd.

The examples of exemplary compounds A-1 to A-8 will be described as specific examples of urethane (meth)acrylate below. However, the present invention is not limited to these specific examples.

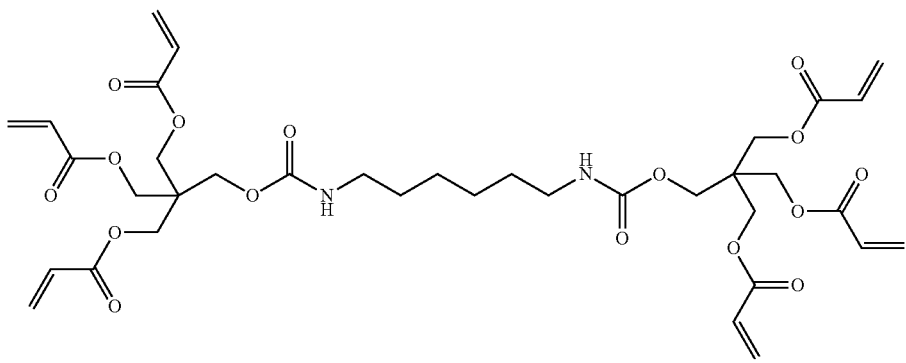

A-1

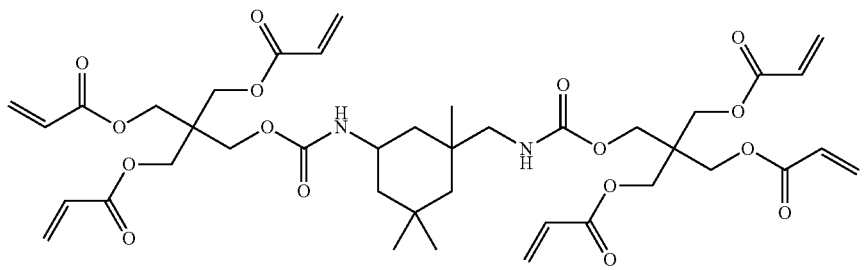

A-2

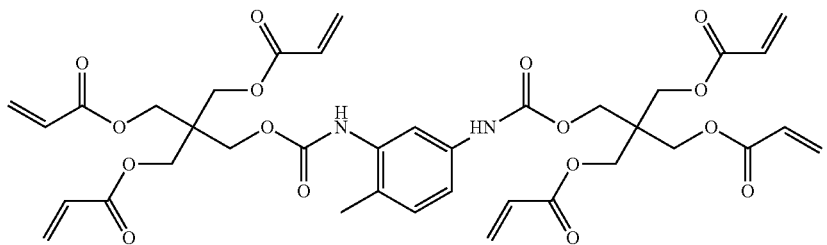

A-3

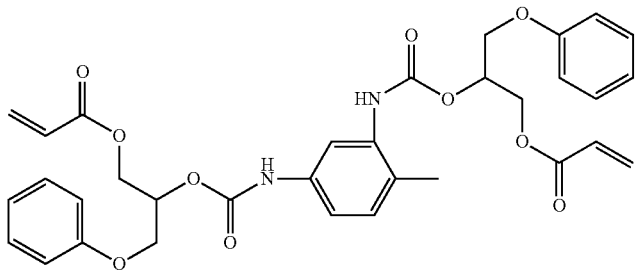

A-4

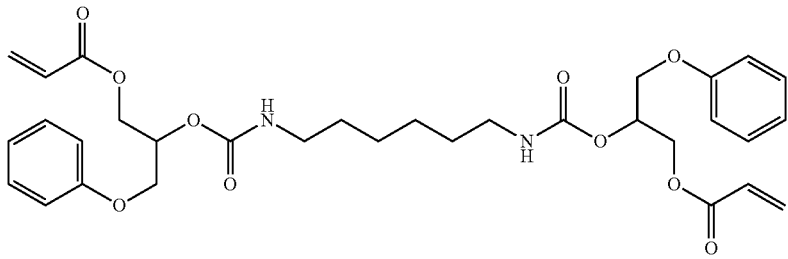

A-5

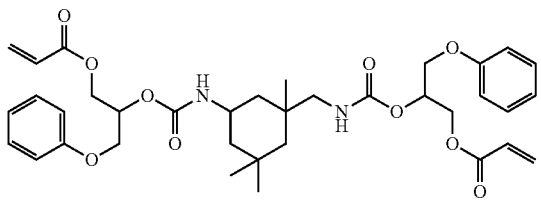

A-6

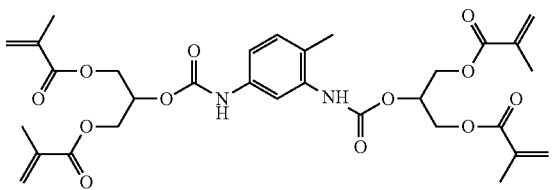

A-7

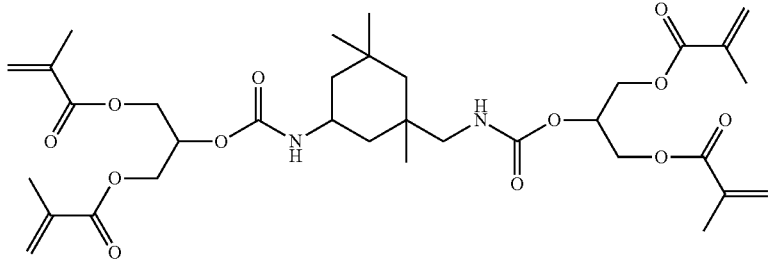

A-8

The urethane (meth)acrylate has been described above. It is possible for the radical polymerizable compound (multifunctional (meth)acrylate), at least one of which is contained in the above composition, that contains at least 2 radical polymerizable groups selected from the above group per molecule, not to contain a urethane bond. In the above composition, a compound having a radical polymerizable group in the form of a radical polymerizable group other than a radical polymerizable selected from the above group can be employed in combination with the above multifunctional (meth)acrylate. Below, a radical polymerizable compound that does not correspond to a first radical polymerizable compound (urethane (meth)acrylate) will be described with the "second radical polymerizable compound" irrespective of whether it corresponds to a multifunctional (meth)acrylate. The second radical polymerizable compound, which does not correspond to a multifunctional (meth)acrylate, can have one or more urethane bond per molecule, or none at all. The combined use of the first radical polymerizable compound (urethane (meth)acrylate) and the second radical polymerizable compound is desirable from both the perspective of further improving brittleness and further inhibiting curling. From these perspectives, the weight ratio when the above composition contains a first radical polymerizable compound and a second radical polymerizable compound is desirably first radical polymerizable compound/second radical polymerizable compound=3/1 to 1/30, preferably 2/1 to 1/20, and more preferably, 1/1 to 1/10.

The content of the multifunctional (meth)acrylate in the above composition is desirably 30 weight % or greater, preferably 50 weight % or greater, and more preferably, 70 weight % or greater per 100 weight % of the entire composition. The content of the multifunctional (meth)acrylate in the above composition is desirably 98 weight % or less, preferably 95 weight % or less, and more preferably, 90 weight % or less per 100 weight % of the entire composition.

The content of the first radical polymerizable compound (urethane (meth)acrylate) in the above compound is desirably 30 weight % or greater, preferably 50 weight % or greater, and more preferably, 70 weight % or greater per 100 weight % of the entire composition. Incorporating a large quantity of the first radical polymerizable compound (urethane (meth)acrylate) is desirable from the perspective of achieving a hard coat layer of greater hardness. From the perspective of further improving brittleness, the content of the first radical polymerizable compound (urethane (meth)acrylate) is desirably 98 weight % or less, preferably 95 weight % or less, and more preferably, 90 weight % or less per 100 weight % of the entire composition.

In one form, the second radical polymerizable compound is desirably a radical polymerizable compound that contains two or more radical polymerizable groups per molecule and has no urethane bonds. The radical polymerizable groups that are contained in the second radical polymerizable compound are desirably functional groups having ethylenic unsaturated double bonds. In one form, vinyl groups are desirable. In another form, the functional group having the ethylenic unsaturated double bonds is desirably a radical polymerizable group selected from the above group. That is, the second radical polymerizable compound is desirably a (meth)acrylate without a urethane bond. That is, the second radical polymerizable compound desirably has no urethane bond and has a radical polymerizable group selected from the group consisting of acryloyloxy groups, acryloyl groups, methacryloyloxy groups, and methacryloyl groups. Further, the second radical polymerizable compound can also contain a radical polymerizable compound in the form of one or more radical polymerizable groups selected from the group consisting of acryloyloxy groups, acryloyl groups, methacryloyloxy groups, and methacryloyl groups per molecule, as well as one or more other radical polymerizable groups.

The number of radical polymerizable groups contained per molecule in the second radical polymerizable compound is desirably at least 2, preferably 3 or more, and more preferably, 4 or more. In one form, the number of radical polymerizable groups contained per molecule in the second radical polymerizable compound is, for example, 10 or fewer. However, the number exceeding 10 is also possible. A radical polymerizable compound with a molecular weight of 200 or more but less than 1,000 is desirable as the second radical polymerizable compound.

Examples of the second radical polymerizable compound are given below. However, the present invention is not limited to the compounds given by way of example below.

Examples are polyethylene glycol 200 di(meth)acrylate, polyethylene glycol 300 di(meth)acrylate, polyethylene glycol 400 di(meth)acrylate, polyethylene glycol 600 di(meth) acrylate, triethylene glycol di(meth)acrylate, epichlorohydrin-modified ethylene glycol di(meth)acrylate (an example of a commercial product being Denacol DA-811 made by Nagase Chemtex), polypropylene glycol 200 di(meth)acrylate, polypropylene glycol 400 di(meth)acrylate, polypropylene glycol 700 di(meth)acrylate, ethylene oxide (EO) and propylene oxide (PO) block polyether di(meth)acrylate (an example of a commercial product being the Bremmer PET series made by NOF Corporation), dipropylene glycol di(meth)acrylate, bisphenol A EO-adduct-type di(meth) acrylate (an example of a commercial product being M-210 made by Toagosei Co., Ltd.; NK Ester A-BPE-20 made by Shin Nakamura Chemical Co., Ltd.), hydrogenated bisphenol A EO-adduct-type di(meth)acrylate (NK Ester A-HPE-4, made by Shin Nakamura Chemical Co., Ltd.), bisphenol A PO-adduct-type di(meth)acrylate (an example of a commercial product being Light Acrylate BP-4PA made by Kyoeisha Chemical Co., Ltd.), bisphenol A epichlorohydrin adduct-type di(meth)acrylate (an example of a commercial product being Epicuril 150, made by Daicel UCB Co., Ltd.), bisphenol A EO-PO adduct-type di(meth)acrylate (an example of a commercial product being BP-023-PE made by Toho Chemical Industry Co., Ltd.), bisphenol F EO adduct-type di(meth)acrylate (an example of a commercial product being Alonix M-208 made by Toagosei Co., Ltd.), 1,6-hexanediol di(meth)acrylate, epichlorohydrin-modified products thereof, neopentyl glycol di(meth)acrylate, hydroxypivalic acid neopentyl glycol di(meth)acrylate, caprolactone-modified products thereof, 1,4-butanediol di(meth)acrylate, 1,9-nonanediol di(meth)acrylate, trimethylol propane di(meth) acrylate, tricyclodecane dimethanol di(meth)acrylate, pentaerythritol di(meth)acrylate monostearate, trimethylol propane acrylic acid•benzoic acid ester, isocyanuric acid EO-modified di(meth)acrylate (an example of a commercial product being Alonix M-215 made by Toagosei Co., Ltd.), and other difunctional (meth)acrylate compounds.

Further examples are trimethylol propane tri(meth)acrylate and EO, PO, and epichlorohydrin-modified products thereof; pentaerythritol tri(meth)acrylate; glycerol tri(meth) acrylate and EO, PO, and epichlorohydrin-modified products thereof; isocyanuric acid EO-modified tri(meth)acrylate (an example of a commercial product being Alonix M-315 made by Toagosei Co., Ltd.); tris(meth)acryloyloxyethyl-phosphate; hydrogen phthalate-(2,2,2-tri(meth)acryloyloxymethyl)ethyl; glycerol tri(meth)acrylate and EO, PO, and epichlorohydrin-modified products thereof; and other trifunctional (meth)acrylate compounds; pentaerythritol tetra(meth)acrylate and EO, PO, and epichlorohydrin-modified products thereof; ditrimethylolpropane tetra(meth)acrylate; other tetrafunctional (meth)acrylate compounds; dipentaerythritol penta(meth)acrylate and EO, PO, epichlorohydrin, fatty acid, and alkyl-modified products thereof; other pentafunctional (meth)acrylate compounds; dipentaerythritol hexa(meth)acrylate and EO, PO, epichlorohydrin, fatty acid, and alkyl-modified products thereof; sorbitol hexa(meth)acrylate and EO, PO, epichlorohydrin, fatty acid, and alkyl-modified products thereof; and other hexafunctional (meth)acrylate compounds.

The second radical polymerizable compound is desirably in the form of epoxy(meth)acrylate or polyester (meth) acrylate having a weight average molecular weight of not less than 200 but less than 1,000. Examples of commercial products are the product name Beamset 700 series made by Arakawa Chemical Industries, Ltd.: Beamset 700 (hexafunctional), Beamset 710 (tetrafunctional), Beamset 720 (trifunctional), and the like. Examples of epoxy(meth)acrylates are the product name SP series made by Showa Highpolymer Co., Ltd., such as: SP-1506, 500, SP-1507, 480; the VR series, such as VR-77; and the product names EA-1010/ECA, EA-11020, EA-1025, EA-6310/ECA made by Shin Nakamura Chemical Industries.

Exemplary compounds A-9 to A-11 below are further specific examples of the second radical polymerizable compound.

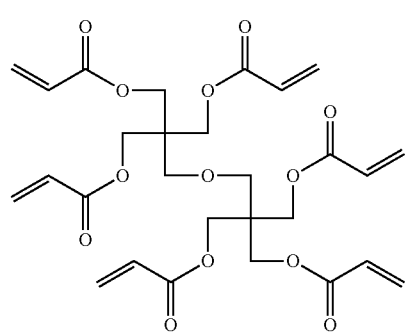

A-9

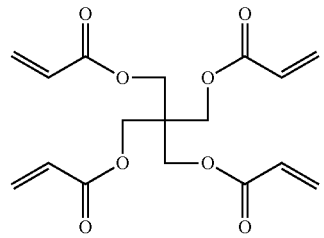

A-10

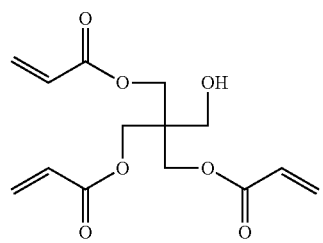

A-11

(Cationic Polymerizable Compound)

In addition to the above-described radical polymerizable compound, the above composition contains a cationic polymerizable compound. As set forth above, the incorporation of a cationic polymerizable compound is presumed by the present inventors to contribute to inhibit curling and achieve improvement in brittleness in the hard coat layer that is formed.

Any cationic polymerizable compound can be employed without limitation so long as it comprises a polymerizable group capable of undergoing cationic polymerization (a cationic polymerizable group). At least one such cationic polymerizable group is contained per molecule. The cationic polymerizable compound can be a monofunctional compound containing one cationic polymerizable group, or a multifunctional compound containing two or more such groups. The number of cationic polymerizable groups contained in the multifunctional compound is not specifically limited. By way of example, this number can be 2 to 6. Two or more cationic polymerizable groups that are contained in a multifunctional compound can be identical or of two or more types.

In one form, the cationic polymerizable compound desirably comprises one or more radical polymerizable groups in addition to a cationic polymerizable group. Reference can be made to the description set forth above regarding radical polymerizable compounds for such radical polymerizable groups present in cationic polymerizable compounds. A functional group having an ethylenic unsaturated double bond is desirable. The functional group having an ethylenic unsaturated double bond is preferably a radical polymerizable group selected from the group consisting of vinyl groups and the above groups. The number of radical polymerizable groups that are present per molecule of cationic polymerizable compound having radical polymerizable groups is at least one, desirably 1 to 3, and preferably 1.

Examples of desirable cationic polymerizable groups are oxygen-containing heterocyclic groups and vinyl ether groups. The cationic polymerizable compound can contain one or more oxygen-containing heterocyclic group and one or more vinyl ether group per molecule.

The oxygen-containing hetero ring can be a single ring or a fused ring. One having a bicyclic structure is desirable. The oxygen-containing hetero ring can be a nonaromatic ring or an aromatic ring. A nonaromatic ring is desirable. Specific examples of single rings are epoxy rings, tetrahydrofuran rings, and oxetane rings. Examples of compounds having bicyclic structures are oxabicyclic rings. The cationic polymerizable group containing the oxygen-containing hetero ring can be contained in the cationic polymerizable compound as a monovalent substituent or as a divalent or higher polyvalent substituent. The fused ring can be a fusion of two or more oxygen-containing hetero rings, or a fusion of one or more oxygen-containing hetero rings and one or more cyclic structures other than oxygen-containing hetero rings. Examples of cyclic structures other than oxygen-containing hetero rings are cycloalkane rings such as cyclohexane rings. However, this is not to be construed as a limitation.

The specific examples of the oxygen-containing heterocyclic ring show below. However, the present invention is not limited to these specific examples.

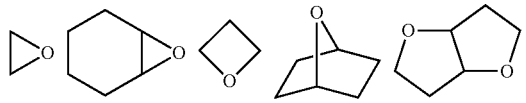

The cationic polymerizable compound can contain a partial structure other than a cationic polymerizable group. There is no specific limitation; examples of such partial structures are linear structures, branched structures, and cyclic structures. These partial structures can contain one or more hetero atoms such as oxygen atoms and nitrogen atoms.

An example of one desirable form of the cationic polymerizable compound is a compound containing a cyclic structure (cyclic structure-containing compound) as a cationic polymerizable group, or as a partial structure in addition to a cationic polymerizable group. For example, one or two cyclic structures can be contained in the cyclic structure-containing compound. The number of cyclic structures contained in the cyclic structure-containing compound can be, for example, 1 to 5. However, this is not a limitation. A compound containing two or more cyclic structures can contain two instances of the same cyclic structure or two or more different cyclic structures.

An oxygen-containing hetero ring is an example of a cyclic structure contained in the cyclic structure-containing compound. The details are as set forth above.

The cationic polymerizable group equivalence (=B/C) that is obtained by dividing the molecular weight (referred to hereinafter as "B") by the number of cationic polymerizable groups (referred to hereinafter as "C") contained per molecule of cationic polymerizable compound is, for example, 300 or lower. From the perspective of forming a hard coat layer with good adhesion to the plastic substrate in the hard coat film, the cationic polymerizable group equivalence is desirably less than 150. On the other hand, from the perspective of hygroscopicity of a hard coat layer, the cationic polymerizable group equivalence is desirably 50 or more. In one form, the cationic polymerizable group contained in the cationic polymerizable compound based on which the cationic polymerizable group equivalence is calculated can be an epoxy group (epoxy ring). That is, in one form, the cationic polymerizable compound is an epoxy ring-containing compound. From the perspective of forming a hard coat layer having good adhesion to the plastic substrate in the hard coat film, the epoxy equivalence as calculated by dividing the molecular weight by the number of epoxy rings contained per molecule of the epoxy ring-containing compound is desirably less than 150. The epoxy group equivalence of the epoxy ring-containing compound can be 50 or more, for example.

The molecular weight of the cationic polymerizable compound is desirably 500 or less, preferably 300 or less. The present inventors presume that keeping the molecular weight within the above-stated range facilitates penetration of the cationic polymerizable compound into the plastic substrate and permits the formation of a hard coat layer with good adhesion.

A nitrogen-containing hetero ring is another example of a cyclic structure contained in the above cyclic structure-containing compound. A nitrogen-containing hetero ring-containing compound is a desirable cationic polymerizable compound from the perspective of forming a hard coat layer having good adhesion to the plastic substrate in the hard coat film. A compound having one or more nitrogen-containing hetero rings selected from the group consisting of isocyanurate rings (the nitrogen-containing hetero rings contained in exemplary compounds B-1 to B-3 farther below) and glycoluril rings (the nitrogen-containing hetero rings contained in exemplary compound B-10 farther below) per molecule is desirable as a nitrogen-containing hetero ring-containing compound. Among these, a compound containing an isocyanurate ring (an isocyanurate ring-containing compound) is preferred as a cationic polymerizable compound from the perspective of forming a hard coat layer with good adhesion to the plastic substrate in the hard coat film. This is presumed by the present inventors to be due to the good affinity of isocyanurate rings for the resin constituting the plastic substrate. From this perspective, a plastic substrate containing an acrylic resin film is preferred. It is even more preferable for the surface in direct contact with the hard coat layer to be the surface of an acrylic resin film.

Another example of a cyclic structure contained in the above cyclic structure-containing compound is an alicyclic structure. Examples of alicyclic structures are cyclic ring, dicyclic ring, and tricyclic ring structures. Specific examples are dicyclopentanyl rings and cyclohexane rings.

The cationic polymerizable compound set forth above can be synthesized by known methods. It is also available in the form of commercial products.

Specific examples of cationic polymerizable compounds containing oxygen-containing hetero rings as cationic polymerizable groups are: 3,4-epoxycyclohexylmethyl-3',4'-epoxycyclohexane carboxylates (for example, commercial products such as UVR6105 and UVR6110 made by Union Carbide Co., Ltd., and Celloxide 2021 made by Daicel Co., Ltd. UCB); bis(3,4-epoxycyclohexylmethyl)adipate (for example, UVR6128 made by Union Carbide Co., Ltd.); vinylcyclohexene monoepoxide (for example, Celloxide 2000 made by Daicel Co., Ltd. UCB); ε-caprolactone-modified 3,4-epoxycyclohexylmethyl-3',4'-epoxycyclohexanecarboxylate (for example, Celloxide 2081 made by Daicel Co., Ltd.); 1-methyl-4-(2-methyloxylanyl)-7-oxabicyclo[4,1,0]heptane (for example, Celloxide 3000 made by Daicel Co., Ltd.); 7,7'-dioxa-3,3'-bi[bicyclo[4.1.0]heptane] (for example, Celloxide 8000 made by Daicel Co., Ltd.); 3-ethyl-3-hydroxymethyloxetane; 1,4-bis(((3-ethyl-3-oxetanyl)methoxy)methyl)benzene; 3-ethyl-3-(phenoxymethyl)oxetane; 3-ethyl-3-(2-ethylhexyoxymethyl)oxetane; and di[1-ethyl(3-oxetanyl)]methylether.

Specific examples of cationic polymerizable compounds containing vinyl ether groups as cationic polymerizable groups are: 1,4-butanediol divinyl ether, 1,6-hexanediol divinyl ether, nonanediol divinyl ether, cyclohexanediol divinyl ether, cyclohexane dimethanol divinyl ether, triethylene glycol divinyl ether, trimethylol propane trivinyl ether, and pentaerythritol tetravinyl ether. A cationic polymerizable compound having a vinyl ether group that contains an alicyclic structure is desirable.

The compounds given as examples in JP-A-H08-143806 and JP-A-H08-283320; JP-A-2000-186079, JP-A-2000-327672, JP-A-2004-315778, JP-A-2005-29632, and the like can be used as cationic polymerizable compounds.

Exemplary compounds B-1 to B-14 below are specific examples of cationic polymerizable compounds. However, the present invention is not limited to the specific examples given below.

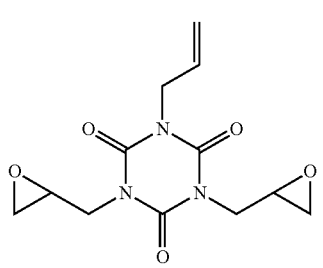 B-1

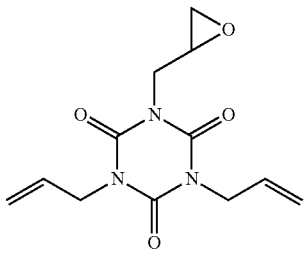 B-2

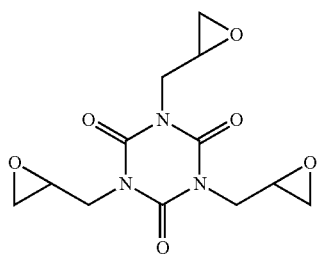 B-3

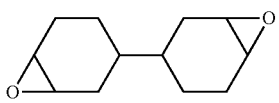 B-4

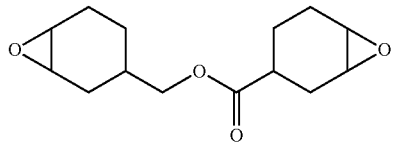 B-5

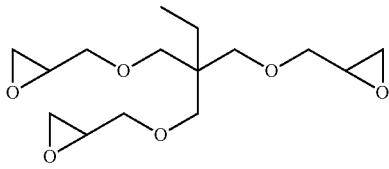 B-6

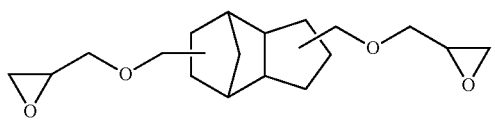 B-7

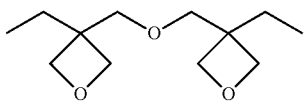 B-8

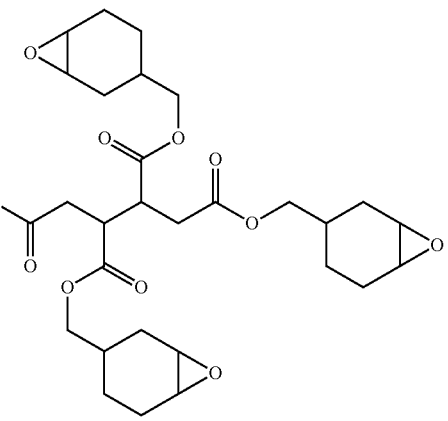

B-9

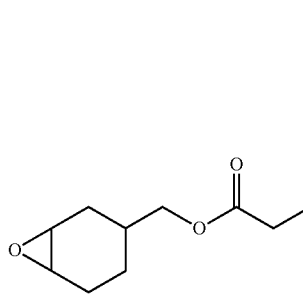

B-10

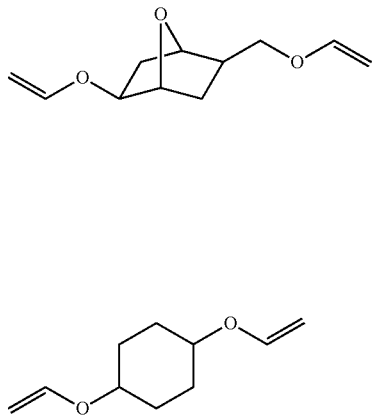

B-11

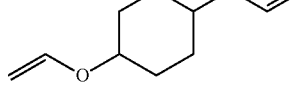

B-12

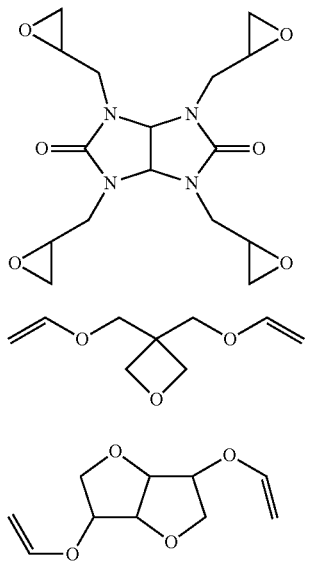

B-13

B-14

From the perspective of forming a hard coat layer with good adhesion to the plastic substrate in the hard coat film, the following are examples of desirable forms of the above composition relating to cationic polymerizable compounds. Satisfying one of the following forms is desirable, satisfying two or more is preferred, satisfying three or more is of greater preference, and satisfying all of them is of still greater preference. A single cationic polymerizable compound desirably satisfies multiple forms. For example, one desirable form is a nitrogen-containing hetero ring-containing compound with a cationic polymerizable group equivalence of less than 150.

(1) Comprising a cationic polymerizable compound in the form of a nitrogen-containing hetero ring-containing compound. The nitrogen-containing hetero ring that is present in the nitrogen-containing hetero ring-containing compound is desirably selected from the group consisting of isocyanurate rings and glycoluril rings. The nitrogen-containing hetero ring-containing compound is preferably an isocyanurate ring-containing compound. More preferably, the isocyanurate ring-containing compound is an epoxy group-containing compound containing one or more epoxy rings per molecule.

(2) Containing a cationic polymerizable compound in the form of a cationic polymerizable compound with a cationic polymerizable group equivalence of less than 150. Desirably containing an epoxy group-containing compound with an epoxy equivalence of less than 150.

(3) Containing a cationic polymerizable compound in the form of a functional group having an ethylenic unsaturated double bond.

(4) Containing a cationic polymerizable compound in the form of an oxetane ring-containing compound comprising one or more oxetane rings per molecule along with another cationic polymerizable compound. The oxetane ring-containing compound desirably does not contain a nitrogen-containing hetero ring.

The content of cationic polymerizable compound in the above composition is desirably 10 weight parts or more, preferably 15 weight parts or more, and more preferably, 20 weight parts or more per 100 weight parts of the combined contents of the multifunctional (meth)acrylate and cationic polymerizable compound. The content of the cationic polymerizable compound in the above composition is desirably 0.05 weight part or more, preferably 0.1 weight part or more, and more preferably, 1 weight part or more per 100 weight parts of the combined contents of the first radical polymerizable compound and the cationic polymerizable compound. The incorporation of a large amount of cationic polymerizable compound is desirable from the perspective of further improving brittleness and further inhibiting curling in the hard coat layer. From the perspective of achieving greater hardness in the hard coat layer, the proportion accounted for by the first radical polymerizable compound in the polymerizable compound contained in the composition is desirably high. From this perspective, the content of the cationic polymerizable compound is desirably 50 weight parts or less, preferably 40 weight parts or less, per 100 weight parts of the combined contents of the first radical polymerizable compound and the cationic polymerizable compound. The content of the cationic polymerizable compound in the above composition is desirably 50 weight parts or less per 100 weight parts of the combined contents of the multifunctional (meth)acrylate and the cationic polymerizable compound.

In the present invention, the compound comprising both a cationic polymerizable group and a radical polymerizable group is classified as a cationic polymerizable compound and the content in the composition is specified.

<Photopolymerization Initiator>

The above composition contains polymerizable compounds in the form of a radical polymerizable compound and a cationic polymerizable compound. To initiate the polymerization reactions of these polymerizable compounds of differing forms of polymerization by irradiating them with light, the above composition comprises a radical photopolymerization initiator and a cationic photopolymerization initiator. A single radical photopolymerization initiator can be employed, or two or more compounds with differing structures can be employed in combination. The same holds true for the cationic photopolymerization initiator.

Each photopolymerization initiator will be described in sequence.

(Radical Photopolymerization Initiator)

Any known radical photopolymerization initiator can be employed without limitation so long as it can generate radicals as active species when irradiated with light. Specific examples are: diethoxyacetophenone, 2-hydroxy-2-methyl-1-phenylpropane-1-one, benzyldimethylketal, 4-(2-hydroxyethoxy)phenyl(2-hydroxy-2-propyl)ketone, 1-hydroxycyclohexylphenylketone, 2-methyl-2-morpholino(4-thiomethylphenyl)propane-1-one, 2-benzyl-2-dimethylamino-1-(4-morpholinophenyl)butanone, 2-hydroxy-2-methyl-1-[4-(1-methylvinyl)phenyl]propanone oligomer, 2-hydroxy-1-[4-[4-(2-hydroxy-2-methyl-propionyl)hexyl]phenyl]-2-methylpropane-1-one, and other acetophenones; 1,2-octanedione, 1-[4-(phenylthio)-, 2-(O-benzoyloxime)] ethanone, 1-[9-ethyl-6-(2-methylbenzoyl)-9H-carbazol-3-yl]-1-(0-acetyloxime), and other oxime esters; benzoin, benzoinmethylether, benzoinethylether, benzoinisopropylether, benzoinisobutylether, and other benzoins; benzophenone, o-benzoylmethyl benzoate, 4-phenylbenzophenone, 4-benzoyl-4'-methyldiphenylsulfide, 3,3',4,4'-tetra(t-butylperoxycarbonyl)benzophenone, 2,4,6-trimethylbenzophenone, 4-benzoyl-N,N-dimethyl-N-[2-(1-oxo-2-propenyloxy)ethyl]benzenemetanamiumbromide, (4-benzoylbenzyl)trimethylammoniumchloride, and other benzophenones; 2-isopropylthioxanthone, 4-isopropylthioxanthone, 2,4-diethylthioxanthone, 2,4-dichlorothioxanthone, 1-chloro-4-propxythioxanthone, 2-(3-dimethyl-amino-2-hydroxy)-3,4-dimethyl-9H-thoxanthone-9-one methochloride, and other thioxanthones; 2,4,6-trimethylbenzoyl diphenylphosphineoxide, bis(2,6-dimethoxybenzoyl)-2,4,4-trimethyl pentylphosphineoxide, bis(2,4,6-trimethylbenzoyl)-phenylphosphineoxide, and other acylphosphineoxides. Radical photopolymerization initiator adjuvants in the form of triethanolamine, triisopropanolamine, 4,4'-dimethylaminobenzophenone (Michler's ketone), 4,4'-diethylaminobenzophenone, 2-dimethylamino-ethyl benzoate, ethyl 4-dimethylaminobenzoate, (n-butoxy) ethyl 4-dimethylaminobenzoate, isoamyl 4-dimethylaminobenzobenzoate, 2-ethylhexyl 4-dimethylaminobenzoate, 2,4-diethylthioxanthone, 2,4-diisopropylthioxanthone, and the like can be employed in combination.

The above radical photopolymerization initiators and adjuvants can be synthesized by known methods and are available as commercial products.

The content of the radical photopolymerization initiator in the above composition can be suitably adjusted within a range allowing the polymerization reaction of the radical polymerizable compound (radical polymerization) to progress smoothly and is not specifically limited. By way of example, the content of the radical photopolymerization initiator is within a range of 0.1 to 20 weight parts, desirably within a range of 0.5 to 10 weight parts, and preferably within a range of 1 to 10 weight parts per 100 weight parts of radical polymerizable compound contained in the above composition (when a radical polymerization compound not corresponding to the above multifunctional (meth)acrylate is contained, the combined contents of it and the above multifunctional (meth)methacrylate).

(Cationic Photopolymerization Initiator)

Any cationic photopolymerization initiator that is capable of generating cations as active species when irradiated with light will do; known cationic photopolymerization initiators can be employed without limitation. Specific examples are known sulfonium salts, ammonium salts, iodonium salts (such as diaryliodonium salt), triarylsulfonium salts, diazonium salts, and iminium salts. More specific examples are the cationic photopolymerization initiators denoted by formulas (25) to (28) given in paragraphs 0050 to 0053 in Japanese Unexamined Patent Publication (KOKAI) Heisei No. 8-143806, and the compounds given as examples of cationic polymerization catalysts in paragraph 0020 in Japanese Unexamined Patent Publication (KOKAI) Heisei No. 8-283320. Cationic photopolymerization initiators can be synthesized by known methods and are available as commercial products. Examples of commercial products are CI-1370, CI-2064, CI-2397, CI-2624, CI-2639, CI-2734, CI-2758, CI-2823, CI-2855, and CI-5102, made by Nippon Soda Co., Ltd., Photoinitiator 2047 made by Solvay; UVI-6974 and UVI-6990 made by Union Carbide; and CPI-10P made by San-Apro, Ltd.

From the perspectives of the sensitivity to light of the photopolymerization initiator, the stability of the compound, and the like, diazonium salts, iodonium salts, sulfonium salts, and iminium salts are desirable as cationic photopolymerization initiators. From the perspective of weatherability, iodonium salts are preferred.

Examples of specific commercial products of cationic photopolymerization initiators based on iodonium salts are B2380 made by Tokyo Chemical Industry Co., Ltd.; BBI-102 made by Midori Chemicals; WPI-113 made by Wako Pure Chemical Industries; WPI-124 made by Wako Pure Chemical Industries; WPI-169 made by Wako Pure Chemical Industries; WPI-170 made by Wako Pure Chemical Industries; and DTBPI-PFBS made by Toyo Gosei.

Specific examples of iodonium salt compounds that can be used as cationic photopolymerization initiators are compounds FK-1 and FK-2 described farther below.

Cationic Photopolymerization Initiator (Iodonium Salts Compound) FK-1

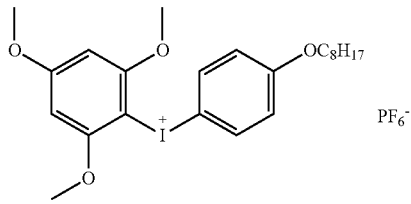

Cationic Photopolymerization Initiator (Iodonium Salts Compound) FK-2

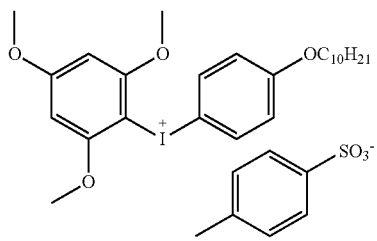

The content of the cationic photopolymerization initiator in the above composition can be suitably adjusted to within a range at which the polymerization reaction (cationic polymerization) of the cationic polymerizable compound proceeds smoothly and is not specifically limited. For example, the content of the cationic photopolymerization initiator is within a range of 0.1 to 200 weight parts, desirably within a range of 1 to 150 weight parts, and preferably within a range of 2 to 100 weight parts per 100 weight parts of cationic polymerizable compound.

<Optional Components>

The photopolymerizable hard coating composition relating to one form of the present invention contains the above-described polymerizable compounds and photopolymerization initiators. It can also contain one or more optional components. Specific examples of optional components are solvents and various additives.

(Solvent)

Organic solvents are desirable as solvents contained as optional components. One or more organic solvents mixed in any ratio can be employed. Specific examples of organic solvents are methanol, ethanol, propanol, n-butanol, i-butanol, and other alcohols; acetone, methyl isobutyl ketone, methyl ethyl ketone, cyclohexanone, and other ketones; ethylcellosolve and other cellosolves; toluene, xylene, and other aromatic solvents; propylene glycol monomethyl ether and other glycol ethers; methyl acetate, ethyl acetate, butyl acetate, and other acetic acid esters; and diacetone alcohols. The content of solvent in the above composition can be suitably adjusted to within a range at which the coatability of the composition can be ensured. For example, the content of solvent is 50 to 500 weight parts, desirably 80 to 200 weight parts, per 100 weight parts of the total amount of the polymerizable compounds and the photopolymerization initiators.

(Additives)

The above composition can optionally contain one or more known additives as needed. Examples of such additives are surface conditioners, leveling agents, and polymerization inhibitors. For details regarding additives, reference can be made to Japanese Unexamined Patent Publication (KOKAI) No. 2012-229412, paragraphs 0032 to 0034, for example. However, this is not a limitation. The various additives that are commonly employed in photopolymerizable compositions can be employed. The quantity of additive that is added to the composition can be suitably adjusted and is not specifically limited.

<Method of Preparing the Composition>

The photopolymerizable hard coating composition relating to one form of the present invention can be prepared by mixing the above-described various components simultaneously, or sequentially in any order. The method of preparation is not specifically limited. A known stirring apparatus or the like can be employed in the preparation.

<Method of Coating the Composition>

The above composition is a photopolymerizable hard coating composition and can be used to form a hard coat layer by being coated on a plastic substrate directly or over another layer such as a pressure adhesive layer or adhesive layer and irradiated with light. The coating can be conducted by a known coating method such as dip coating, air knife coating, curtain coating, roller coating, die coating, wire coating, or gravure coating. The amount of coating can be adjusted to a quantity permitting the formation of a hard coat layer of desired film thickness. The thickness of the hard coat layer is, for example, 3 µm or greater, desirably 5 µm or greater, preferably 10 µm or greater, more preferably 20 µm or greater, still more preferably, greater than 20 µm, and yet still more preferably, 30 µm or greater. A thick hard coat layer is desirable from the perspective of enhancing scratch resistance, but the greater the thickness, the more prone the hard coat layer is to curling. By contrast, the above composition forms hard coat layers in which curling is inhibited even in thick films. From the perspective of reducing the thickness of the hard coat film containing the hard coat layer and reducing the thickness of products equipped with hard coat films, a thin hard coat film is desirable. From this perspective, the thickness of the hard coat layer is desirably 500 µm or less, preferably 300 µm or less, more preferably 100 µm or less, still more preferably 80 µm or less, and yet still more preferably, 60 µm or less. The hard coat layer can be formed as a hard coat layer with a laminate structure of two or more layers (for example, about two to five layers) by simultaneously or sequentially coating two or more compositions with different components. In that case, it suffices to form at least one of the hard coat layers using the above composition. The thickness of the hard coat layer with such a laminate structure refers to the combined thickness of the multiple layers that are laminated.

<Photopolymerization Processing>

Subjecting the coated composition to photopolymerization processing (irradiation with light) causes the polymerization reactions of the radical polymerizable compound and cationic polymerizable compound to undergo the effects of the radical photopolymerization initiator and cationic photopolymerization initiator, respectively, and begin to progress. The wavelength of the light that is irradiated can be determined based on the type of polymerizable compounds and polymerization initiators employed. Examples of the light source for radiating light are high-pressure mercury lamps emitting light in the 150 to 450 nm wavelength range, ultrahigh-pressure mercury lamps, carbon arc lamps, methyl halide lamps, xenon lamps, chemical lamps, electrodeless discharge lamps, and LEDs. The amount of light irradiated normally falls within a range of 30 to 3,000 mJ/cm$^2$ and desirably falls within a range of 100 to 1,500 mJ/cm$^2$. Either, or both, before and/or after irradiation with light, drying can be conducted as needed. The drying temperature need only be set to dry off the solvent and is not specifically limited. Here, the term "drying temperature" refers to the temperature of the drying air or the temperature of the atmosphere within the heating furnace.

[Hard Coat Layer and a Method of Manufacturing the Same, and the Article Containing a Hard Coat Film]

A further form of the present invention relates to a hard coat film comprising a plastic substrate and a hard coat layer formed by subjecting the above photopolymerizable hard coating composition to photopolymerization processing.

A further form of the present invention relates to a method of manufacturing a hard coat film comprising forming a hard coat layer by subjecting the photopolymerizable hard coating composition to photopolymerization processing; and containing a plastic substrate and a hard coat layer.

A further form of the present invention relates to an article containing a hard coat film.

<Hard Coat Layer>

The details of the hard coat layer contained in the hard coat film and how to form it are as set forth above. At least one surface (preferably the hard coat layer outer surface) of a hard coat film comprising such a hard coat layer will desirably exhibit the scratch resistance of evaluation standard A or B, preferably scratch resistance A, in the scratch resistance evaluation described in the embodiments farther below. A hard coat layer formed of the above-described composition will inhibit curling and improve brittleness in addition to such high scratch resistance. With regard to inhibiting curling, an evaluation standard of A or B is desirably achieved, preferably A, in evaluation of the degree of curling described in the embodiments farther below, for example. With regard to improvement in brittleness, an evaluation standard of S, A, or B, preferably S or A, and more preferably S, is achieved in the brittleness evaluation described in the embodiments farther below, for example. As set forth above, the hard coat layer is a layer that has a pencil hardness of 2H or greater, desirably has a pencil hardness of 3H or greater, more preferably has a pencil hardness of 4H or greater, still more preferably has a pencil hardness of 5H or greater, yet more preferably has a pencil hardness of 6H or greater, and yet still more preferably, has a pencil hardness of 7H or greater, The higher the pencil hardness of the hard coat layer, the better.

<Plastic Substrate>

The substrate that is contained in the above hard coat film is a plastic substrate. As set forth above, plastic substrates by themselves tend to scratch readily. However, by providing a hard coat layer formed by photopolymerization processing the composition relating to one form of the present invention, a high degree of hardness can be achieved.

Normally, a film-type plastic substrate (plastic substrate film) can be employed as the plastic substrate. Single-layer films of known resin films and laminate films of two or more layers of resin film can be employed as the plastic substrate. Such plastic substrate films are available as commercial products and can be manufactured by known film manufacturing methods. Examples of resin films are acrylic resin films, polycarbonate resin films, polyolefin resin films, polyester resin films, and acrylonitrile butadiene styrene copolymer (ABS) films. In one desirable form, the plastic substrate contains at least one film selected from the group consisting of acrylic resin films and polycarbonate resin films. In one desirable form, the plastic substrate is a laminate film of two layers or more of resin film. Here, the number of laminations is, for example, two layers or three layers, and is not specifically limited. The above acrylic resin film is a polymer or copolymer resin film containing one or more monomers selected from the group consisting of acrylic acid esters and methacrylic acid esters. An example is a polymethyl methacrylate resin (PMMA) film. The thickness of the plastic substrate desirably falls within a range of 15 to 800 µm, preferably falls within a range of 20 to 500 µm, and more preferably, falls within a range of 200 to 500 µm. The total thickness of the laminate film is what is being referred to here. The surface of the plastic substrate can be optionally subjected to an adhesion-enhancing treatment such as a corona discharge treatment by a known method.

<Optional Layers>

The hard coat film relating to one form of the present invention contains at least the above-described hard coat layer and plastic substrate. It can optionally contain one or more other layers. Such optional layers are not to be construed as being limited to the following examples, namely adhesion-enhancing layers and antireflective layers (a laminate film comprised of one or more high refractive index layers and one or more low refractive index layers). In this regard, reference can be made to paragraphs 0069 to 0091 in U.S. Pat. No. 5,048,304. Decorative layers can also be provided.

<Article Containing a Hard Coat Film>

Examples of articles containing the above-described hard coat film are various articles required to be scratch resistant in various sectors of industry, including the home appliance industry, the electrical and electronic product industry, the automotive industry, and the residential industry. Specific examples are touch sensors, touch panels, liquid crystal display devices, and other image display devices, the window glass of automobiles, and residential window glass. These articles are desirably provided with hard coat films in the form of protective surface films to provide articles with good scratch resistance.

EXAMPLES

The present invention will be described more specifically below based on embodiments. The materials, use quantities, ratios, processing contents, processing procedures, and the like that are set forth in the embodiments below can be suitably modified within the scope and spirit of the present invention. Accordingly, the scope of the present invention is not to be interpreted as being limited by the specific examples presented below.

The polymerizable compounds employed in Examples 1 to 25 and Comparative Examples 1, 2, 5, and 6 below are exemplary compounds that have been mentioned above. Commercial products were employed for all of these polymerizable compounds.

The polymerizable compound employed in Comparative Example 3 is polymer F9 (nonfunctional urethane polymer) employed in the Examples of Japanese Unexamined Patent Publication (KOKAI) No. 2010-122315. A synthetic product synthesized by urethane polymerizing pentaerythritol triacrylate with an adduct of hexamethylene diisocyanate and trimethylolpropane was employed. Polymer F9, a first radical polymerizable compound, is denoted as C-1 in Table 1 farther below.

The polymerizable compound employed in Comparative Example 4 is resin composition (X-1) (resin concentration 100%) employed as Examples 1 in Japanese Unexamined Patent Publication (KOKAI) No. 2012-229412. A synthetic product synthesized by the method described in paragraph 0050 in the above-cited publication was employed. This synthetic product, a first radical polymerizable compound, is denoted as C-2 in Table 1 farther below.

Examples 1 to 25, Comparative Examples 1 to 6

1. Formula of Photopolymerizable Hard Coating Composition (Coating Liquid of Hard Coat Layer)

| | |
|---|---|
| Radical polymerizable compound (see Table 1): | See Table 1 |
| Cationic polymerizable compound (see Table 1): | See Table 1 |
| Radical photopolymerization initiator (Irg 127 made by BASF) | 4 weight parts |
| Cationic photopolymerization initiator (see Table 1): | See Table 1 |
| Methyl ethyl ketone: | 25 weight parts |
| Methyl isobutyl ketone: | 75 weight parts |

2. Preparation of Hard Coat Layer Coating Liquid

Prescribed quantities of the above radical polymerizable compound, cationic polymerizable compound, methyl ethyl ketone, and methyl isobutyl ketone were mixed and stirred for 20 minutes in a stirring apparatus (stirrer), after which the radical photopolymerization initiator and cationic photopolymerization initiator were sequentially added and stirring was conducted for another 5 minutes. The mixture obtained was passed through a filter with a mean pore size of 5 μm and a hard coat layer coating liquid was obtained.

3. Preparation of Hard Coat Film

Using a #48 wire bar, the above hard coat layer coating liquid was coated so as to achieve the film thickness indicated in Table 1 upon drying on a plastic substrate film about 300 μm in thickness (Technolloy C101 made by Sumika Acryl Co., Ltd.; three-layer structure laminated in the sequence PMMA film/polycarbonate film/PMMA film). Following application, the coating was dried by blowing 60° C. hot air for 1 minute. Subsequently, a high-pressure mercury lamp was used to irradiate UV radiation from a height of 18 cm above the coating surface at a cumulative dose of 600 mJ/cm$^2$ and cure (photopolymerize) the hard coat coating liquid, thereby fabricating a hard coat film having a urethane (meth)acrylate hard coat layer on a plastic substrate film.

In Example 23, an electrostatic capacitive touch sensor was adhered by the method described in Japanese Unexamined Patent Publication (KOKAI) No. 2013-206444 to the opposite surface of the plastic substrate film from that on which the above hard coat layer had been formed.

4. Evaluation Methods (1) Evaluation of Scratch Resistance

The pencil hardness evaluation described in JIS K5400 was conducted as an indicator of scratch resistance.

Specifically, the hard coat films fabricated in the Examples and Comparative Examples were humidity conditioned for two hours in an environment of a temperature of 25° C. and a relative humidity of 60%. Subsequently, the 7H test pencil specified in JIS 56006 was used to implement the pencil hardness test described in JIS K5400 with a load of 1 kg in five different spots on the outer surface of the hard coat layer. Scratch resistance was evaluated on the following evaluation scale based on the test results.

A: No scratches observed in n=5 evaluations
B: 1 or 2 scratches observed in n=5 evaluations
C: 3 or more scratches observed in n=5 evaluations (2) Evaluation of Degree of Curling Samples 10×10 cm in size were cut from the hard coat films fabricated in the Examples and Comparative Examples immediately (within one hour) following fabrication. The sample was placed on a horizontal table with the side on which the four corners rose positioned upward. The distance by which the four corners rose from the surface of the table was measured with a ruler, and the average value of the four corners was calculated. Based on the average value calculated, the degree of curling was evaluated on the following evaluation scale:

S: 0 mm to less than 2 mm
A: 2 mm to less than 5 mm
B: 5 mm to less than 10 mm
C: 10 mm or more (3) Brittleness Evaluation Samples 40×200 mm in size were cut from the hard coat films fabricated in the Examples and Comparative Examples.

One end (A) of the sample was secured in a lengthwise direction in the vicinity of the gap of a flat plate jig having a gap 7 mm in width and the other end (B) was passed through the gap and pulled out on the opposite side from the front side.

The sample that was pulled out to the opposite side was formed into a hairpin loop, and end (B) was passed through the same gap and pulled out to the front side from the opposite side.

This process was implemented so that the surface of the hard coat layer was positioned to the outside.

The sample was examined visually for cracking following pulling, the distance to where the cracking started from edge (A) on the secured side was measured with a ruler, and an evaluation was made based on the following evaluation scale. The shorter the distance, the smaller the radius of curvature when cracking occurred, and the less the tendency to crack, that is, the greater the improvement in brittleness indicated.

S: 50 mm or less
A: 51 to 60 mm
B: 60 to less than 75 mm
C: 75 mm or more (4) Weatherability Evaluation Samples 40×50 mm in size were cut out of the hard coat films fabricated in Examples 16 and 17. The samples obtained were spectrally measured at wavelengths of 380 to 780 nm with an ultraviolet-visible-near infrared spectrophotometer UV-3150 (made by Shimadzu Corp.). A C light source—the standard light source specified by the Commission Internationale de l'Eclairage (CIE)—was used to measure color b* in the CIE's L*a*b* colorimetric system. The b* obtained here is denoted as b* (Fr) below.

Next, the hard coat films fabricated in the Examples and Comparative Examples were placed for 1000 hours in an environment of 60° C. and 85% relative humidity and humidity conditioned for 2 hours in an environment of 25° C. and 60% relative humidity, after which spectral measurement and b* measurement were conducted in the same manner as above. The b* obtained here is recorded as b* (after 60° C., 85%) below.

The tint difference was calculated from equation 1 below from the values obtained in the various measurements.

$$\Delta b^* = b^*(\text{after } 60° \text{ C.}, 85\%) - b^*(\text{Fr}) \qquad \text{Equation 1}$$

Based on the tint difference calculated, weatherability was evaluated on the following evaluation scale:

S: $\Delta b^*$=less than 0.5 . . . no tint change detected
A: $\Delta b^*$=0.5 to less than 0.75 . . . almost no change in tint detected
B: $\Delta b^*$=0.75 to less than 1.0 . . . slight change in tint detected
C: $\Delta b^*$=1.0 or more . . . change in tint detected The results of the above are given in Table 1.

TABLE 1

| | photopolymerizable hard coating composition | | | | | | | | | |
|---|---|---|---|---|---|---|---|---|---|---|
| | Radical polymerizable compound | | Cationic polymerizable compound | | Cationic photopolymerization initiator | | Thickness of hard coat layer (μm) | Evaluation result | | |
| | kind | Amount of additive (weight parts) | kind | Amount of additive (weight parts) | kind | Amount of additive (weight parts) | | Scratch resistance | Degree of curling | Brittleness |
| Example 1 | A-1 | 90 | B-1 | 10 | CPI-100P | 4 | 35 | A | A | S |
| Example 2 | A-1 | 90 | B-1 | 10 | CPI-100P | 4 | 40 | A | A | S |
| Example 3 | A-1 | 85 | B-2 | 15 | CPI-100P | 4 | 30 | A | A | S |
| Example 4 | A-3 | 75 | B-4 | 25 | CPI-100P | 4 | 38 | A | A | S |
| Example 5 | A-5 | 70 | B-6 | 30 | CPI-100P | 4 | 35 | A | A | S |
| Example 6 | A-4 | 50 | B-5 | 50 | CPI-100P | 4 | 35 | B | A | S |
| Example 7 | A-2 | 99.95 | B-2 | 0.05 | CPI-100P | 4 | 40 | A | B | B |
| Example 8 | A-6 | 90 | B-7 | 10 | CPI-100P | 4 | 20 | B | A | S |
| Example 9 | A-1 | 85 | B-11 | 15 | CPI-100P | 4 | 36 | A | A | S |
| Example 10 | A-1 | 70 | B-1 | 10 | CPI-100P | 4 | 32 | A | A | S |
| | | | B-11 | 20 | | | | | | |
| Example 11 | A-1 | 80 | B-12 | 20 | CPI-100P | 4 | 40 | A | A | S |
| Example 12 | A-1 | 65 | B-1 | 10 | CPI-100P | 4 | 35 | A | A | S |
| | | | B-12 | 25 | | | | | | |
| Example 13 | A-3 | 90 | B-13 | 10 | CPI-100P | 4 | 36 | A | A | S |
| Example 14 | A-1 | 70 | B-1 | 15 | CPI-100P | 4 | 36 | A | A | S |
| | | | B-13 | 15 | | | | | | |
| Example 15 | A-1 | 80 | B-14 | 20 | CPI-100P | 4 | 33 | A | A | S |
| Example 16 | A-3 | 20 | B-2 | 10 | CPI-100P | 4 | 32 | A | B | S |
| | A-9 | 70 | | | | | | | | |
| Example 17 | A-3 | 20 | B-2 | 10 | B2380 | 4 | 32 | A | B | S |
| | A-9 | 70 | | | | | | | | |
| Example 18 | A-1 | 90 | B-2 | 10 | CPI-100P | 4 | 35 | A | A | S |
| Example 19 | A-1 | 90 | B-3 | 10 | CPI-100P | 4 | 35 | B | A | S |
| Example 20 | A-1 | 90 | B-4 | 10 | CPI-100P | 4 | 35 | A | A | S |
| Example 21 | A-1 | 75 | B-12 | 25 | CPI-100P | 4 | 35 | A | A | S |
| Example 22 | A-1 | 65 | B-2 | 10 | CPI-100P | 4 | 35 | A | A | S |
| | | | B-12 | 25 | | | | | | |
| Example 23 | A-1 | 65 | B-3 | 10 | CPI-100P | 4 | 35 | B | A | S |
| | | | B-12 | 25 | | | | | | |
| Example 24 | A-1 | 65 | B-3 | 10 | CPI-100P | 4 | 35 | A | A | S |
| | | | B-10 | 25 | | | | | | |
| Example 25 | A-1 | 65 | B-1 | 10 | CPI-100P | 4 | 35 | A | A | S |
| | | | B-12 | 25 | | | | | | |
| Comparative Example 1 | A-1 | 100 | — | — | CPI-100P | 4 | 40 | A | C | C |
| Comparative Example 2 | — | — | B-1 | 100 | CPI-100P | 4 | 38 | C | A | S |
| Comparative Example 3 | C-1 | 100 | — | — | CPI-100P | 4 | 40 | A | C | C |
| Comparative Example 4 | C-2 | 100 | — | — | CPI-100P | 4 | 35 | A | C | C |
| Comparative Example 5 | A-1 | 100 | — | — | CPI-100P | 4 | 35 | B | C | C |
| Comparative Example 6 | A-1 | 90 | B-1 | 10 | — | — | 35 | C | C | C |

(In Table 1, CPI-10P made by San-Apro, Ltd. and B2380 (iodonium salts compound) made by Tokyo Chemical Industry Co., Ltd).

Evaluation Results

Based on the results shown in Table 1, the hard coat films fabricated in the Examples were found to exhibit good scratch resistance and brittleness, as well as inhibited curling.

By contrast, the hard coat films fabricated in Comparative Examples 1, 3, 4, and 5 using just multifunctional (meth)acrylate as the polymerizable compound exhibited good scratch resistance but did not exhibit inhibited curling or inhibited brittleness deterioration.

The hard coat film fabricated in Comparative Example 6, which contained multifunctional (meth)acrylate and a cationic polymerizable compound, but did not contain a cationic photopolymerization initiator, exhibited poor scratch resistance, degree of curling, and brittleness.

The hard coat film fabricated in Comparative example 2 employing just a polymerizable compound in the form of a cationic polymerizable compound exhibited inhibited curling and brittleness, but had poor scratch resistance.

Based on the above results, the combined use of polymerizable compounds in the form of multifunctional (meth)acrylate and cationic polymerizable compounds, and the combined use of a radical photopolymerization initiator and a cationic photopolymerization initiator to polymerize polymerizable compounds of differing forms of polymerization, were determined to inhibit curling and brittleness deterioration in a multifunctional (meth)acrylate hard coat layer with good scratch resistance.

In the results of weatherability evaluation conducted by the method set forth in (4) above, the result of the weatherability evaluation of Example 16 was C and that of Example 17 was A. Based on these results, the use of an iodonium salt compound as a cationic photopolymerization initiator was found to be desirable from the perspective of weatherability.

Examples and Comparative Examples shown in Table 2 were subjected to a test of the adhesion between the hard coat layer and the plastic substrate by the method described in JIS K5400. Specifically, the hard coat films fabricated in the Examples and Comparative Examples were humidity conditioned for 2 hours in an environment of a temperature of 25° C. and 60% relative humidity. Subsequently, a total of 100 squares were formed in an area by making 10 equal cuts at an equal spacing of 1 mm vertically and horizontally with a cutter knife on the surface of the hard coat layer. Cellophane tape (made by Nichiban Corp.) was applied to the surface in which this area had been formed to test adhesion. In the adhesion test, fresh cellophane tape was adhered and then removed 30 minutes later, with this process being repeated five times in the same place. Adhesion was evaluated on the following evaluation scale based on the number of squares that separated from the hard coat layer surface following the adhesion test. An evaluation result of S, A, B, or C was determined to indicate adequate adhesion between the hard coat surface and the plastic substrate in practical terms. The results are given in Table 2. Table 2 gives the molecular weight of the cationic polymerizable compounds employed in Examples and Comparative Examples indicated in Table 2, the cationic polymerization group equivalence, whether isocyanurate rings were present, whether the functional group had an ethylenic unsaturated double bond, and the epoxy equivalent of the epoxy ring-containing compound.

S: Separation of 0 squares
A: Separation of 1 to 9 squares
B: Separation of 10 to 19 squares
C: Separation of 20 to 29 squares
D: Separation of 30 or more squares The present invention is useful in various fields of industry, including the home appliance industry, the electrical and electronic product industry, the automotive industry, and the residential industry.

The present disclosure relates to the subject matter contained in Japanese Patent Application No. 074680/2014 filed on May 31, 2014, in Japanese Patent Application No. 199034/2014 filed on Sep. 29, 2014 and in Japanese Patent Application No. 044734/2015 filed on Mar. 6, 2015, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A composition, which is a photopolymerizable hard coating composition comprising:
   a radical polymerizable compound having two or more radical polymerizable groups selected from the group consisting of acryloyloxy groups, acryloyl groups, methacryloyloxy groups, and methacryloyl groups per molecule;

TABLE 2

| | Cationic polymerizable compound | | | | | | |
|---|---|---|---|---|---|---|---|
| | Kind | Molecular weight | Cationic polymerization group equivalence | Epoxy equivalent | Whether nitrogen-containing hetero rings were present | Whether isocyanurate rings were present | Whether the functional group having an ethylenic unsaturated double bond | Test of the adhesion |
| Example 1 | B-1 | 281 | 141 | 141 | Yes | Yes | Yes | A |
| Example 12 | B-1 | 281 | 141 | 141 | Yes | Yes | Yes | S |
| | B-12 | 170 | 57 | — | None | None | None | |
| Example 18 | B-2 | 265 | 265 | 265 | Yes | Yes | Yes | B |
| Example 19 | B-3 | 297 | 99 | 99 | Yes | Yes | None | A |
| Example 20 | B-4 | 194 | 97 | 97 | None | None | None | C |
| Example 21 | B-12 | 170 | 57 | — | None | None | None | C |
| Example 22 | B-2 | 265 | 265 | 265 | Yes | Yes | Yes | A |
| | B-12 | 170 | 57 | — | None | None | None | |
| Example 23 | B-3 | 297 | 99 | 99 | Yes | Yes | None | S |
| | B-12 | 170 | 57 | — | None | None | None | |
| Example 24 | B-10 | 366 | 92 | 92 | Yes | None | None | C |
| Example 25 | B-1 | 281 | 141 | 141 | Yes | Yes | Yes | S |
| | B-12 | 170 | 57 | — | None | None | None | |
| Comparative Example 5 | — | — | — | — | — | — | — | D |
| Comparative Example 6 (None cation photopolymerization initiator) | B-1 | 281 | 141 | 141 | Yes | Yes | Yes | D | a cationic polymerizable compound;
a radical photopolymerization initiator; and
a cationic photopolymerization initiator,
wherein the cationic polymerizable compound comprises a cyclic structure-containing compound,
wherein the cyclic structure-containing compound contains a nitrogen-containing hetero ring-containing compound, and
wherein the nitrogen-containing hetero ring-containing compound contains one or more nitrogen-containing hetero ring selected from the group consisting of isocyanurate rings and glycoluril rings per molecule.

2. The composition according to claim 1, wherein the radical polymerizable compound is a urethane bond-containing compound containing one or more urethane bonds per molecule.

3. The composition according to claim 2, wherein the urethane bond-containing compound contains two or more urethane bonds per molecule.

4. The composition according to claim 1, wherein the nitrogen-containing hetero ring-containing compound contains an isocyanurate ring-containing compound.

5. The composition according to claim 1, wherein the cationic polymerizable compound contains a cationic polymerizable compound having a cationic polymerizable group equivalence of less than 150 obtained by dividing the molecular weight by the number of cationic polymerizable groups contained per molecule.

6. The composition according to claim 5, wherein the cationic polymerizable compound with a cationic polymerizable group equivalence of less than 150 is an epoxy ring-containing compound in which the epoxy equivalence obtained by dividing the molecular weight by the number of epoxy rings contained per molecule is less than 150.

7. The composition according to claim 1, wherein the cationic polymerizable compound contains one or more functional groups having an ethylenic unsaturated double bond per molecule.

8. The composition according to claim 1, wherein the molecular weight of the cationic polymerizable compound is 500 or less.

9. The composition according to claim 1, wherein the molecular weight of the cationic polymerizable compound is 300 or less.

10. The composition according to claim 1, which contains 0.05 to 50 weight parts of the cationic polymerizable compound per 100 weight parts of the combined contents of the cationic polymerizable compounds and the radical polymerizable compounds.

11. A hard coat film, which comprises:
a plastic substrate; and
a hard coat layer formed by subjecting the composition according to claim 1 to photopolymerization processing.

12. The hard coat film according to claim 11, wherein the plastic substrate contains at least one film selected from the group consisting of acrylic resin films and polycarbonate resin films.

13. The hard coat film according to claim 11, wherein the plastic substrate is a laminate film of two or more layers of resin film.

14. An article, which comprises a hard coat film according to claim 11.

15. The article according to claim 14, which comprises the hard coat film as a protective surface film.

* * * * *